(No Model.)
F. SCHENKENBERG.
CHECKREIN CARRIER AND BLINDER STAY FOR BRIDLES.
No. 368,244. Patented Aug. 16, 1887.
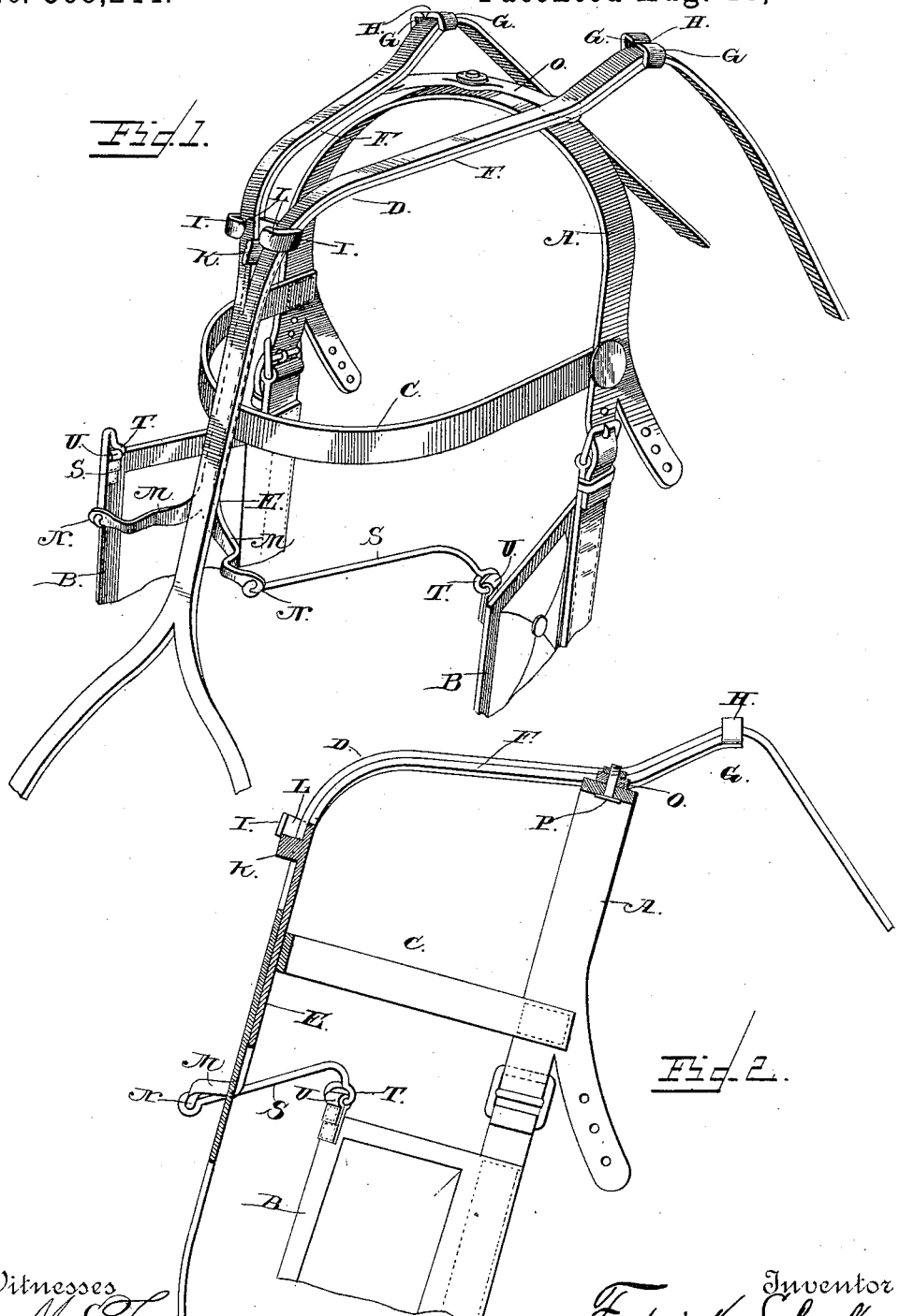
Witnesses
M. Fowler
J. W. Gardner
Inventor
Frederick Schenkenberg
By his Attorneys
C. A. Knowles

UNITED STATES PATENT OFFICE.

FREDERICK SCHENKENBERG, OF FORT ATKINSON, WISCONSIN.

CHECKREIN-CARRIER AND BLINDER-STAY FOR BRIDLES.

SPECIFICATION forming part of Letters Patent No. 368,244, dated August 16, 1887.

Application filed November 11, 1886. Serial No. 218,611. (No model.)

*To all whom it may concern:*

Be it known that I, FREDERICK SCHENKENBERG, a citizen of the United States, residing at Fort Atkinson, in the county of Jefferson and State of Wisconsin, have invented a new and useful Improvement in a Combined Checkrein-Carrier and Blinder-Stay, of which the following is a specification.

My invention relates to an improvement in combined checkrein-carriers and blinder-stays; and it consists in the peculiar construction and combination of devices, that will be more fully set forth hereinafter, and particularly pointed out in the claims.

In the accompanying drawings, Figure 1 is a perspective view of a combined checkrein-carrier and blinder-stay embodying my improvements attached to the crown-strap of a bridle. Fig. 2 is a detailed sectional view of the same, taken on the line $x$ $x$ of Fig. 1.

A represents the crown-strap of a bridle, which passes over the top of the horse's head. The lower end is provided with holes for the buckling of the bit-straps, to which are attached the blinders B, only a section of which is here shown.

C represents the usual brow-band.

D represents the checkrein-carrier, which is made of a metallic strip formed like the letter Y and having the stem E and the diverging arms F. The said arms F are bent rearwardly and upwardly from the upper end of the stem, thereby shaping the carrier to conform to the horse's head, and the extreme rear ends of the arms are bent upwardly, and thereby raised a suitable distance above the head of the horse and out of contact therewith. Ears G are formed at the outer ends of the arms, and are bent upwardly and have their upper ends bent inwardly toward each other, thereby forming loops H. At the crotch formed by the intersection of the arms on the outer sides of the same are ears I, which are bent outwardly from the arms and have their outer ends turned inwardly toward each other. From the front side of the stem, at the upper end thereof, projects a stud, K, which is arranged centrally between the ears I, and, in connection with the said ears, forms two loops, L. The lower end of the seem is bifurcated and provided with feet M, which extend outwardly in opposite directions and have eyes N formed at their outer ends.

O represents a transverse bar which connects the arms F at a suitable distance from the rear ends thereof. A rivet or screw, P, passes through an opening in the center of the crown-strap and through an opening in the center of the arm O, thereby pivoting the carrier on the upper side of the bridle, so as to allow it to swing from one side to the other in front of the horse's face. A washer is secured on the upper end of the stem of the rivet or screw.

S represents the blinder-stays, which are made of wire rods of suitable length and diameter, and have their inner ends hooked to the eyes N of the carrier, and eyes T formed at their outer ends. Loops U connect the said eyes to the outer upper corners of the blinders. By having the stays hooked to the carrier, as previously described, flexible joints are formed, which are advantageous in the following particulars: First, in fitting the bridle to the head of a horse the blinder-stays adjust themselves, thus dispensing with a take-up at the crown-strap; second, the horse is not likely to bend one of the stays when rubbing his head against a post or other object; third, the bridle will sit and remain in a good easy position and is easily fitted to the head.

In connection with my improved form of checkrein-carrier I use a double or two-strap checkrein, which passes through the loops H and L, extends back to the check-hook on the saddle of the harness, and the ends of the checkrein diverge from the loops L and are attached to the bit-rings. The diverging arms F separate the two straps of the checkrein over the top of the horse's head and carry one strap on each side of the ridge formed between the ears of the animal and out of contact therewith, thus preventing the straps from irritating and rubbing the top of the head, and also rendering it impossible for the bridle to be drawn to one side. The pressure of the checkrein-straps on the arms F also serves to move the lower end of the stem of the carrier outwardly from the face of the horse, and thus avoids chafing him.

Having thus described my invention, I claim—

1. The combination, with the crown-strap, of the checkrein-carrier pivotally connected thereto, and having the diverging arms F at its upper side, provided with the loops to retain the checkrein-straps, substantially as described.

2. The checkrein-carrier having the diverging arms F at its upper side to project beyond the crown-strap of the bridle, and provided with the loops or guides through which the checkrein-straps are passed, for the purpose set forth, substantially as described.

3. The checkrein-carrier comprising the stem having the diverging arms F, curved rearwardly and upwardly and provided with the loops H, and the downward and outward extending feet M at the lower end of the stem, in combination with the winker-stays attached to the said feet, substantially as described.

4. The combination, with the checkrein-carrier, of the winker-stays flexibly attached thereto, whereby a flexible joint is formed at or near the center of the winker-stays S, and the blinders or winkers attached to the stays, substantially as described.

5. The checkrein-carrier comprising the stem having the diverging arms F, curved rearwardly and upwardly and having the loops H, the said stem having the loops L, substantially as described.

6. In combination with the checkrein-carrier D, having the feet M, the stays S, flexibly jointed to the feet, and the blinders or winkers connected to the stays S, as set forth.

7. In combination with the checkrein-carrier D, having the diverging arms F, the stud K at the intersection of the arms, and the loop or guides on the arms F for the checkrein, as set forth.

8. The bridle having the checkrein-carrier pivotally connected to the crown-strap, and the stays S, flexibly attached to the blinders and to the checkrein-carrier, whereby the latter and the blinders are adapted to move in unison, substantially as described.

In testimony that I claim the foregoing as my own I have hereto affixed my signature in presence of two witnesses.

FREDERICK SCHENKENBERG.

Witnesses:
C. A. CASWELL,
G. W. McMILLEN.